US009824370B1

(12) United States Patent
Pascal

(10) Patent No.: US 9,824,370 B1
(45) Date of Patent: Nov. 21, 2017

(54) DYNAMIC PHYSICAL INTERACTION TRACKING SYSTEM AND METHOD

(71) Applicant: Andrew Pascal, Las Vegas, NJ (US)

(72) Inventor: Andrew Pascal, Las Vegas, NJ (US)

(73) Assignee: Pascal Ventures, LLC, Las Vegas, NV (US)

(*) Notice: Subject to any disclaimer, the term of this patent is extended or adjusted under 35 U.S.C. 154(b) by 0 days.

(21) Appl. No.: 14/308,733

(22) Filed: Jun. 19, 2014

Related U.S. Application Data

(62) Division of application No. 13/473,349, filed on May 16, 2012, now Pat. No. 8,794,508.

(60) Provisional application No. 61/486,678, filed on May 16, 2011.

(51) Int. Cl.
*G06K 7/00* (2006.01)
*G06Q 30/02* (2012.01)

(52) U.S. Cl.
CPC .............................. *G06Q 30/0207* (2013.01)

(58) Field of Classification Search
USPC ........................ 235/375, 435, 439, 451, 462
See application file for complete search history.

(56) References Cited

U.S. PATENT DOCUMENTS

2011/0029370 A1* 2/2011 Roeding ................ G06Q 30/00
705/14.38

* cited by examiner

*Primary Examiner* — Matthew Mikels
(74) *Attorney, Agent, or Firm* — Muskin and Farmer LLC

(57) ABSTRACT

A method, apparatus, and computer readable storage to implement a social networking game that enables players to scan QR codes (or other identifying markers) and transmit the items scanned to a server that determines the physical location of the player. Players can play a game where they attempt to find and scan as many QR codes as possible. In an embodiment, the QR codes can also be used for crowd control. People in areas that are overly populated can be incentivized to move to lower traffic areas by offering them incentives for reporting to the low traffic area.

18 Claims, 9 Drawing Sheets

DYNAMIC PHYSICAL INTERACTION TRACKING SYSTEM AND METHOD

CROSS REFERENCE TO RELATED APPLICATIONS

This application claims benefit to U.S. provisional application 61/486,678, entitled, "Dynamic Physical Interaction Tracking System and Method" filed on May 16, 2011, which is incorporated by reference herein in its entirety. This application is a divisional application of application Ser. No. 13/473,349 which is incorporated by reference herein in its entirety.

FIELD OF THE INVENTION

Field of the Invention

Embodiments of the inventive concept relate to a system, method, and computer readable storage involving the interaction between users and physical markers in a subject environment as, for example, a mechanism for controlling the location of the users.

Description of the Related Art

The use of physical markers, such as QR (Quick Response) codes, provides businesses with a variety of opportunities to promote products, services, events, sales, etc. A QR code is a two-dimensional barcode that can store information. By downloading an appropriate software-based reader, smart phones are able to read QR codes. Thus, smart phones can become easy-to-use and easy-to-carry QR code readers. There are dozens of QR code reader apps available for cell phones, such as QR Droid and Quickmark Barcode Scanner.

What is needed is a way to utilize physical markers, such as QR codes, to control customer locations, drive customers to achieve certain tasks for a prize and similar customer-directed activities.

SUMMARY OF THE INVENTION

It is an aspect of the present invention to use QR codes in order to control the behavior of customers.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
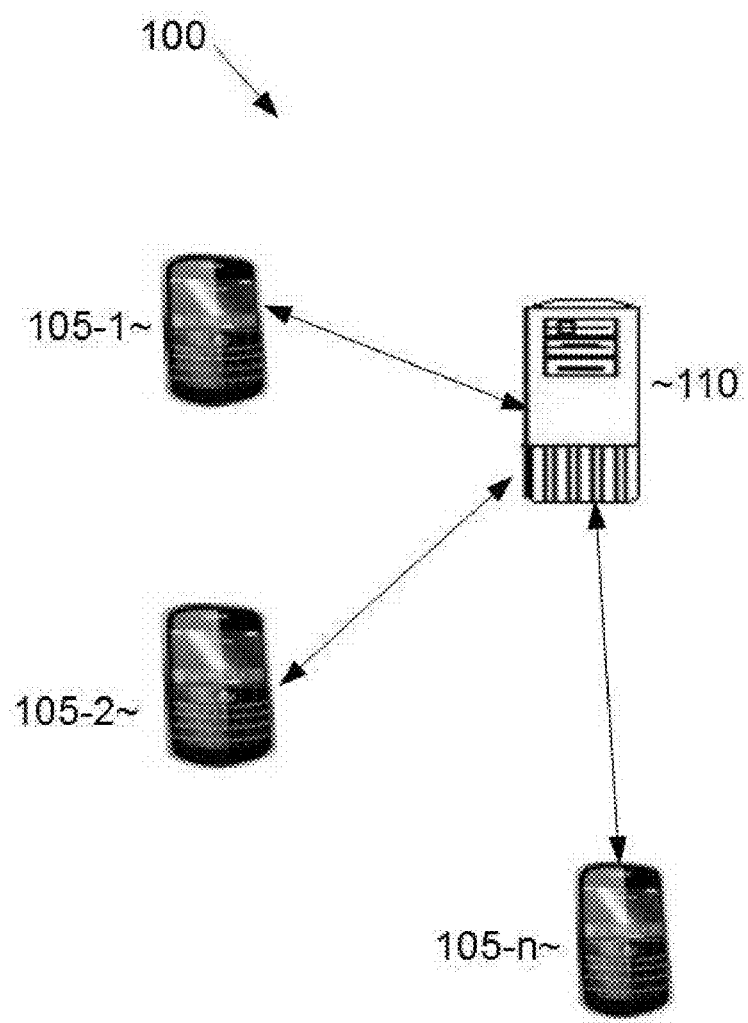
FIG. 1 is a block diagram of a system that is configured to utilize QR codes to control traffic, according to an embodiment.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Accordingly, in one embodiment of the present invention, a business (or property, casino group, etc.) is responsible for placing QR codes in a subject environment (e.g., city, casino, street, building, etc.) and tracking customers as customers use a QR code reader (e.g., smart phone running appropriate software) to read (scan) the QR codes. The business may award prizes based on information relative to how customers read the QR codes. For example, a first customer to scan all QR codes may receive a prize.

In one embodiment, a business with multiple properties in a small geographic region may drive customers to certain less-occupied properties to properly distribute customers across the multiple properties. In another embodiment, a business may construct a sequential maze of QR codes which customers must read in a given order in order to win a prize. In another more basic embodiment, a single business location may provide a free item or coupon to a first customer to locate and read one or more QR codes in the location.

The system and method according to the embodiments of the present invention provide businesses with versatile solutions to attract, direct and entertain customers.

The embodiments of the present invention are directed to a system and method involving the use of physical markers in a subject environment. Tracking of users reading or communicating with the physical markers facilitates numerous programs and solutions between the businesses and customers.

FIG. 1 shows a system 100 according to the embodiments of the present invention. Smart phones 105-1 through 105-n, running appropriate reader software, communicate with a central server 110. Responsive to the smart phones 105-1 through 105-n reading physical markers, such as QR codes, the smart phone 105-1 through 105-n transmit a signal to the central server 110. The central server 110 maintains a record of the physical marker read, the time the physical marker was read and the smart phone 105-1 through 105-n responsible for reading the physical marker.

The embodiments of the present invention contemplate any type of physical marker including QR codes, bar codes, images subject to recognition software, RF tags and the like. In each instance the smart phones 105-1 through 105-n includes an appropriate software-based reader or hardware device (RF receiver) suitable for reading or communicating with the physical marker.

Figure 2:
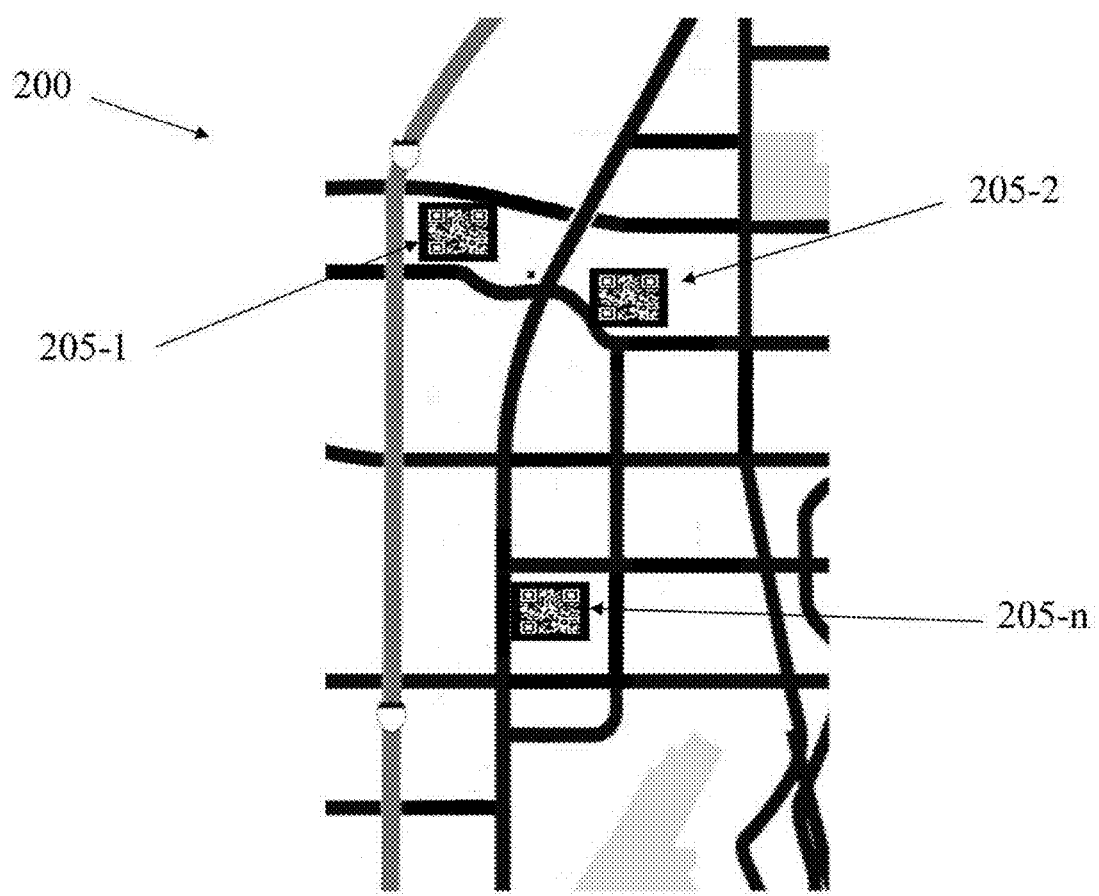
FIG. 2 is a map depicting an exemplary positioning of physical markers throughout an environment, according to an embodiment.

FIG. 2 shows a map 200 of the Las Vegas strip and QR codes 205-1 through 205-n depicted thereon. The map 200 is of the type that may be used to provide a mechanism for users to locate the QR codes 205-1 through 205-n positioned by the business within the environment. In one exemplary embodiment, a multi-property casino operator having multiple properties on the Las Vegas strip places physical markers throughout multiple of its properties. The placement options for the physical markers are limitless such that the physical markers may be placed on slot machines, playing cards, menus, gaming tables, etc. In certain situations the placement of the physical markers may be dictated by a need to attract customers from one or more casino properties to one or more other casino properties. For example, if a first casino property is hosting a large event (e.g., boxing event) while a second casino property is under booked, the casino operator may structure an event by placing the physical markers exclusively in the second casino property to attract customers. By attracting customers, the second property can increase revenue via food and beverage sales and game play. A casino operator can also plan and promote future events limited to customers staying at specific casino properties to encourage customers to book rooms in casino properties which have availability. Such a method allows the multi-property casino operator to spread customers across properties as desired such that certain properties are not overbooked while other properties remain below full occupancy.

Figure 3:
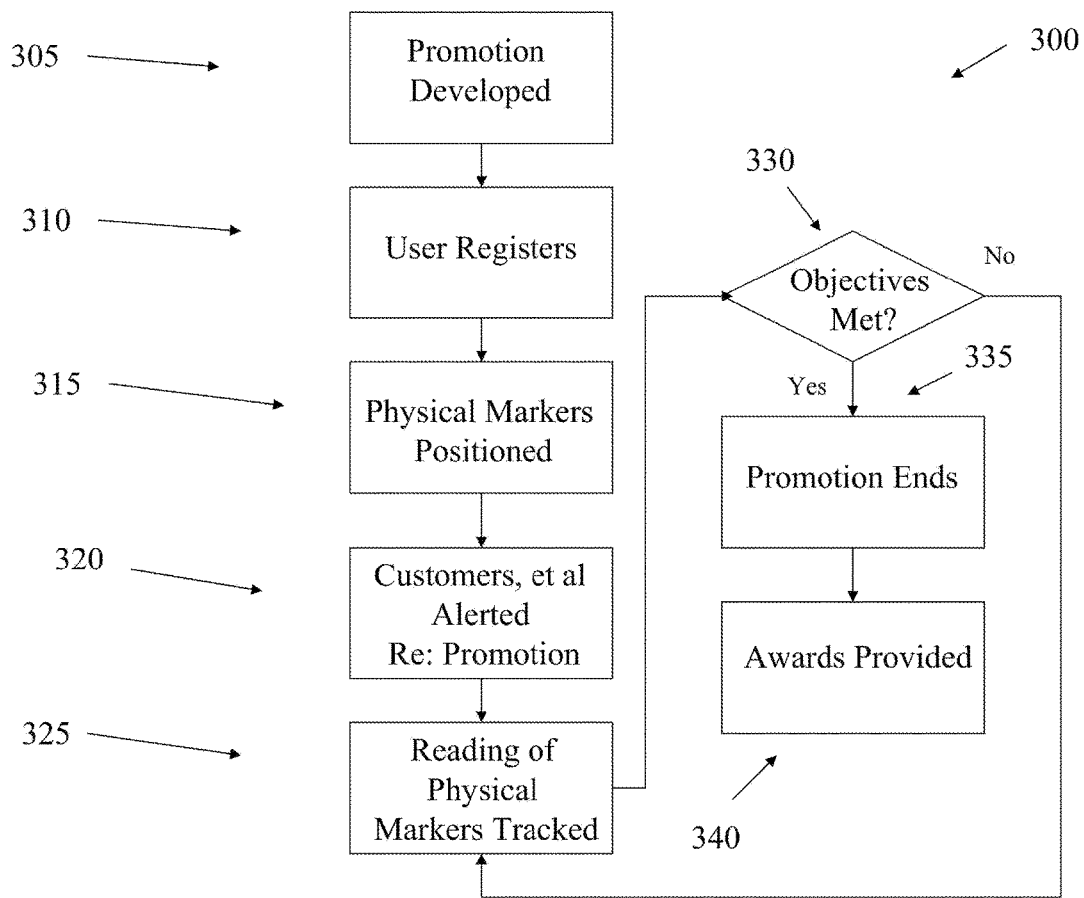
FIG. 3 is a flowchart illustrating an exemplary method of utilizing QR codes to control traffic, according to an embodiment.

FIG. 3 illustrates a flowchart 300 detailing one methodology for utilizing the embodiments of the present invention. The flowchart 300 is directed to a multi-property casino operator, but as detailed herein the embodiments of the present invention are suitable for single properties and any type of industry. In operation 305, a multi-property casino operator develops a promotion utilizing physical markers readable by a smart phone (or similar hand-held device (e.g., PDA)) and/or able to communicate in close proximity to a smart phone (or similar hand-held device (e.g., PDA)). In operation 310, customers of the multi-property casino operator register for the promotion. The registration process comprises providing personal information including smart phone identification information. In operation 315, the multi-property casino operator causes the physical markers to be placed throughout one or more of the casino properties or in proximity thereto. In operation 320, the multi-property casino operator alerts its registered customers of the promotion including optionally hints (e.g., map) relative to the locations of the physical markers. The multi-property casino operator may also notify non-registered customers or potential customers about the promotion and encourage the non-registered customers and potential customers to register. The alerts or notifications may be accomplished via text messages, emails, instant messaging, flyers, radio, television or similar means. In operation 325, the multi-property casino operator causes readings of, or communications with, the physical markers to be tracked and recorded relative to the customers. The tracking may be facilitated by a remote server or on-property server.

In operation 330, it is determined if one or more customers have accomplished the objective of the promotion. For example, have three customers read ten different physical markers across ten different casino properties. If not, the method in the flowchart 300 loops back to operation 325 for continued tracking and recording. If, in operation 330, one or more customers have accomplished the objective of the promotion, at 335, the promotion ends. In operation 340, the one or more customers are provided with an award for completing the objective of the promotion. For example, the first three customers are provided with $25 of free play at any of the casino properties owned by the multi-property casino operator. The order of the flowchart 300 is not critical to the embodiments of the present invention, and the operations can be performed in any logical order.

It is understood that the system may be configured to treat individual customers differently. For example, a first customer may only have to read 5 physical markers while a second customer may have to read 10 physical markers to obtain the same objective of the promotion. Such distinctions may be premised on any number of factors, including the significance of the customer with the business (e.g., a player with more loyalty (comp) points at the casino would be required to read less markers than a player with less loyalty (comp) points at the casino.

In other embodiments, user's actions may be tracked via GPS or similar systems such that physical markers are not necessary to track the whereabouts of participants. Physical items such as tickets may also replace physical markers.

Figure 4:
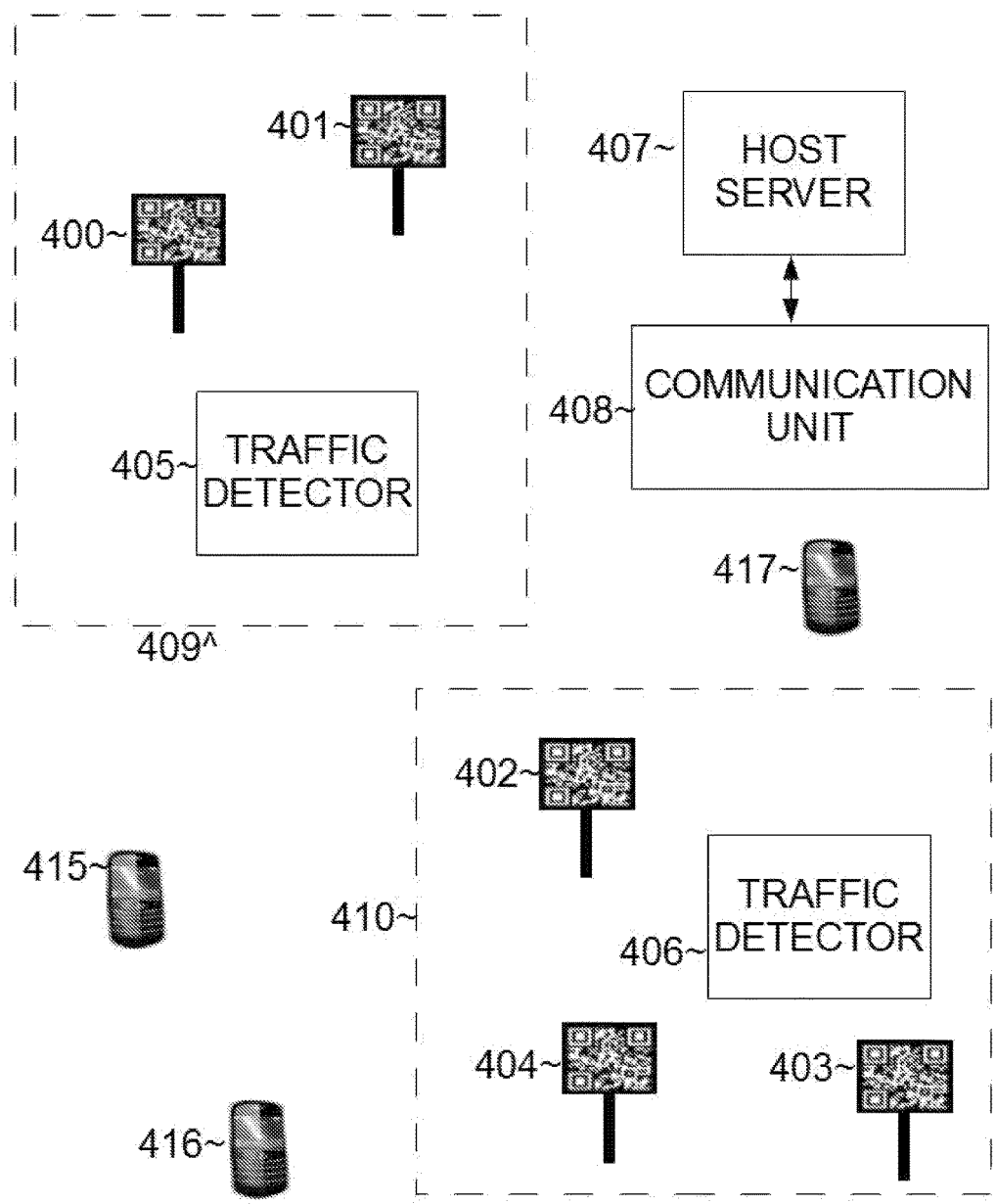
FIG. 4 is a block diagram illustrating components of a system to track people using QR codes, according to an embodiment.

FIG. 4 is a block diagram illustrating components of a system to track people using QR codes, according to an embodiment.

QR codes can be placed on portable signs which can be placed manually by casino personnel. QR codes can also be places on cards or posters which can be hung on walls or elsewhere. A QR code needs no power source and thus can be placed anywhere and embodied on almost anything. QR signs 400, 401, 402, 403, 404 contain QR codes that are placed in various locations throughout a casino (or other property). The actual QR code on each of the signs being used in the system (including 400, 401, 402, 403, 404) are all different (unique) so that each time a player scans a QR code on one of these signs it can be identified exactly which QR code the player scanned. Any number of QR codes can be placed around a property or properties or even around an entire city.

A first physical region 409 is a physical area in a casino which contains QR signs 400, 401 and traffic detector 405. A second physical region 410 is an area in the casino (different from the first physical region with no overlap) which contains QR signs 402, 403, 404.

The first traffic detector 405 is used to detect foot traffic (number of people) in the first region 409. The second traffic detector 406 is used to detect foot traffic (number of people) in the second region 410. The traffic detectors 405, 406 (and all others not pictured) are electronic automatic traffic detectors that can detect (or estimate) an amount of traffic flowing through a particular region or area. There can be any number of additional traffic detectors. Each region should have at least one traffic detector. Traffic detectors can operate in numerous ways. For example, they can be electronic eyes (or lasers) that are tripped whenever someone walks by, thus counting the frequency of pedestrians per unit time. The traffic detectors can also be a scale embedded in the floor which can detect (by an increase in weight) when a person walks by. The traffic detectors can also be a sound detector that detects an increase in background noise which can be equated with an increase in foot traffic at a particular area. In addition, traffic detectors can be mixed, that is, different types of traffic detectors can be placed and work together. Each region can have zero, 1, 2 or more traffic detectors. The traffic detectors communicate (either wireless or using a wired network connection) with a host server 407.

The host server 407 runs software to administer the entire system/method. The host server 407 is in communication with all other electrical components of the system using a computer communications network (wireless or wired). The traffic detectors 405, 406 (and all others being used) report on the traffic they detect to the host server 407 which stores the report traffic and uses the reports traffic to make determinations on the adjustment of traffic (to be discussed below in more detail).

A communication unit 408 is connected to the host server 407 and is equipped to communicate with cell phones of the players. The communication can be via text message, email message, or through a dedicated game application that has been designed for the specific purpose of playing this game (the game application would have a built in QR code reader). The host server 407 can send requests to the players' cell phones (via text message, email, or a message inside the game application) via the communication unit 408. The players' cell phones can also communicate (in both directions) with the host server 407 via text message, email, or inside the game application.

Cell phones 415, 416, 417 are used by players (also referred to as users) to scan the QR codes in the QR signs 400, 401, 402, 403, 404. While cell phones are pictured any other portable computing device (with wireless transmission capability) can be used, such as laptop computers, tablets, PDAs, etc. Each cell phone 415, 416, 417 belongs to a unique player who has registered with the server 407 and thus the server 407 can identify each player by their cell phone (e.g., the cell phone number or other unique identifier). The cell phones 415, 416, 417 can communicate wirelessly (using a cellular network, wi-fi, etc.) with the communication unit 408 in order to communicate with the host server 407. The cell phones 415, 416, 417 would scan any of the QR codes and transmit the scanned data to the host server 407 which would process and store the QR code scanned.

For example, if a player scans a particular QR code, using the game application the game application would automatically identify the particular QR code and transmit the QR code to the host server 407 (via the communication unit) along with a unique identifier (e.g., player username, real name, cell phone number, etc.) In this way, the host server 407 can track which players have scanned which QR codes. Each time a player scans a QR code, this is transmitted to the host server 407 which then stores data indicating which player scanned the QR code, which QR was scanned, and the time. All of this stored data can be stored in a database (e.g., SQL database) for later retrieval and processing.

The block diagram illustrated in Figure only shows one communication unit 408 and one host server 407 for simplicity. However, it can be appreciated that the host server (also referred to as server) can be distributed across many different servers, computers, locations, etc., all of which cooperate to perform the functions described herein. The same goes for the communication unit 408 which can actually be a network of communications equipment (cell phone towers, routers, servers, switches, rings, etc.) that can enable communication (in both directions, from the sever to the portable devices and from the portable devices to the server) with all of the portable devices (including the cell phones 415, 416, 417) and any other device that is being used as part of the system.

It is noted that while FIG. 4 illustrated only two regions, the system can have any number of regions (e.g., 2 through 10 or more). Each region can also vary in size and the sizes of different regions do not need to be constant. Each region is essentially a fictional area and may not really "exist" with any physical structure/borders and is be used for referential purposes.

In an embodiment, the system can control traffic (traffic as used herein refers to foot traffic of patrons in a casino or any public or private indoor or outdoor area) by monitoring the traffic in different regions and encouraging players to visit areas which (at a particular time) have a relatively lighter amount of traffic.

"Player" (and "user") as used herein refer to people who are capable of scanning the QR codes and receiving messages from the host server 407 (via the communication unit 408). Whether or not players decide to act on the messages and change their behavior does not change their status as players. Players would typically need to register with the system (host server 407) in order to be enabled to receive messages from the host server 407 and participate in scanning QR codes which are transmitted to the host server 407. Note that when a player scans a QR code and this fact is transmitted to the host server 407, the actual image of the QR code is not necessarily transmitted but just a number or text string (unique identifier identifying the particular QR code) which represents a decoding of the QR code. In another embodiment, the player can send a simple photograph of a QR code to the host server 407 which will decode the QR code to determine its unique identifier (text string) and then store it in the system. In the latter embodiment, it would not be necessary for the players to actually have a QR reader on their cell phone (just the ability to transmit photographs to the host server 407).

As an example of how the system could operate, assume that the first region 409 is on a first floor of a casino and the second region 410 is on a second region of the casino. The host server 407 is in communication with the first traffic detector 405 and the second traffic detector 406 and it is determined that the first region 409 has twice as much traffic as the second region (for example the first region currently has 100 people and the second region currently has 50 people, or the first region currently had 70 people walk by in the past minute and the second region currently had 40 people walk by in the past minute). In order to improve crowd control, it would be desirable to encourage people from the first region to move to the second region. Thus, the host server 407 can send a message to all of the players (on their cell phones) informing them that all players who scan a QR code in the second region (i.e., second floor of the casino) in the next 10 minutes will receive 50 free comp points added to their players account. It is assumed that once players migrate over to a different region that some of them will likely stay there and not return to the more crowded region.

As a further example, consider that both the first region 409 and the second region 410 contain blackjack tables and it is determined using the traffic detectors 405, 406 (or other mechanisms such as the casino player tracking system can tell which tables in each region are operating at what capacity) that the second region is much more heavily populated than the first region. All players can be sent a message to their cell phones that players who report to any blackjack table in the second region 410 (the region can actually be identified to the players by a floor or other landmark—e.g., "party pit") would receive one free hand with a "blackjack pays double" incentive. Any other incentive can be offered as well, such as extra comp (loyalty) points, a free gift (e.g., free cap), a free drink, etc.

It is further noted that the QR signs 400, 410, 402, 403, 404 do not necessarily have to be stationary but can be moved by casino personnel. For example, of a particular region is detected to be low traffic, and there currently is not a QR sign (or other manifestation of a QR code) in the particular region, then the host server 407 can send a request to a casino personnel in order to place a QR sign in the particular region (either move a QR sign from another region to the particular region or move a QR sign that is in storage (not in public) to the particular region. When a QR signs is relocated, the casino personnel placing the sign should communicate with the host server 407 (using a keyboard, computer, text message on their cell phone, system administrator 915, etc.) that the QR has been relocated and its new location. Locations of QR signs can be identified to the host server in numerous ways, such as physical latitude/longitude coordinates (which can be obtained using a GPS device). Alternatively, each possible location for a QR sign can be identified to the host sever 407 and assigned a unique number, and the host sever 407 can track which particular QR signs is placed at each unique location (identified by its respective unique number). Thus, when a player scans a QR code, the identifier in the QR code is transmitted to the host server 407 which then can retrieve the physical location of that QR code and store data representing the physical location of the player and the time in the database.

When all players are to be sent a message from the host server 407, this would typically be limited to all players that are currently active. For example, if the game is being held in a Las Vegas casino and a player is located out of state, then of course the player does not wish to receive messages related to the game. The host server 407 can identify active players in numerous ways, such as using GPS on the player's cell phones to determine which players are physically located near any region that is part of the game. Alternatively, players using the game app can simply indicate (by pressing a button) whether they want to stay active (and receive messages) or not. Players can also text the host server 407 with a message indicating they wish to currently be included in the game and receive messages (e.g., text "active") or a message indicating the no longer wish to be active and receive messages (e.g., text "stop" to the server 407).

The regions are not limited to being in the same building but can also be located in different physical buildings. For example, a casino group can operate multiple casinos in a city and traffic at one casino may be greater than traffic at another casino in the same casino group (thus it sending customers from one of these casinos to the other would not result in lost profits for the casino group). Thus, the system can be used to encourage players to visit the casino that is less populated. All components of the system (including traffic detectors, etc.) can be in communication (using any type of computer communications network) with the host server 407 regardless of whether they are located in the same physical building as the host server 407 or not.

In another embodiment, the system does not have to be used to control traffic but can also just implement a game for players. For example, players can compete in a tournament in which the goal is to scan as many QR codes in a predetermined amount of time (or the game can end when a predetermined number of players are able to scan a predetermined number of QR codes). For example, a tournament can start each hour (or once each day, etc.) and the first player to find 10 QR codes would win a first prize while the second player to find 10 QR codes would win a second prize, etc. The prizes can be monetary prizes, goods (e.g., free mug, etc.), free comp points, a free room, a discount on a restaurant check, etc. The tournament can require each player to pay an entry fee (e.g., $10) or can be free.

As opposed to a tournament, the game can offer any player who simply scans a predetermined number of QR codes (e.g., 7) a free prize (any prize described herein). The QR codes can be placed strategically around a casino property (or multiple properties belonging to the same casino group), thus encouraging players to walk around and explore only areas owned by the casino property (or group). This could have the effect of reducing foot traffic at a competitor's property. Players can also play in teams, for example a husband and wife can both scan QR codes in each of their cell phones which are all credited to the same account (thus for example, if 7 QR codes need to be found, if the husband finds 4 and the wife finds 3 this would qualify).

Figure 5:
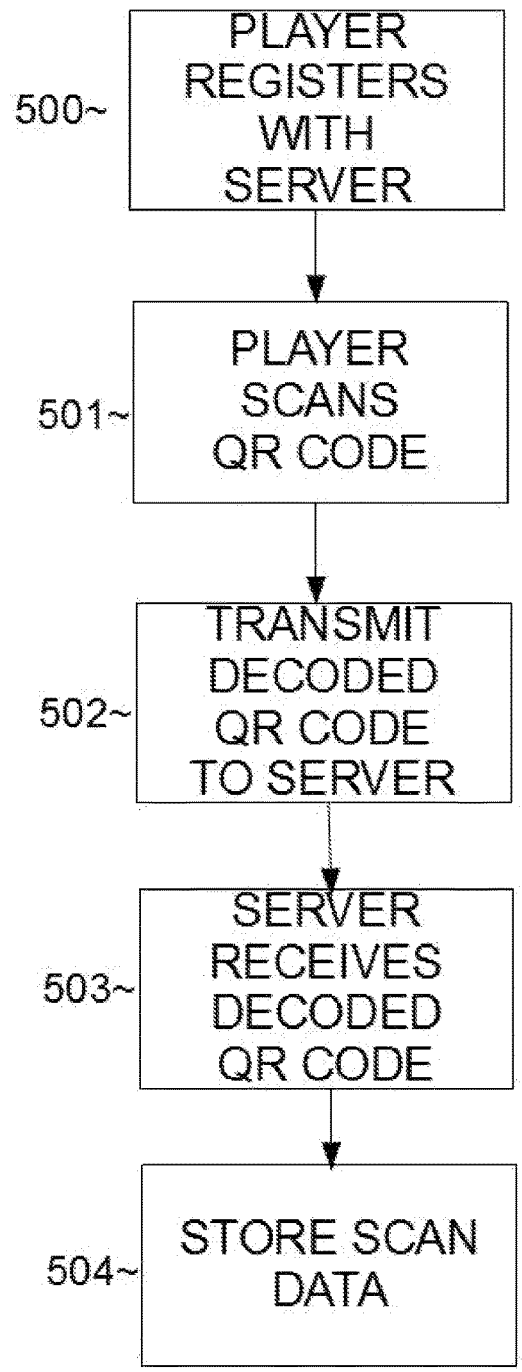
FIG. 5 is a flowchart illustrating an exemplary method of locating a player using a QR code scan, according to an embodiment.

FIG. 5 is a flowchart illustrating an exemplary method of locating a player using a QR code scan, according to an embodiment.

The method can begin with operation 500, wherein the player registers with a server (such as server 407). "Server" as used in FIG. 5 (and everywhere else herein) refers to server 407 (and its affiliated components). It is noted that server 407 is not necessarily a single server but can exist as a combination of servers, computers, etc., on a distributed system. The preferred way a player can register is by the player downloading a specialized application (or "app") on the player's cell phone which was specifically designed to play the game described herein. The app would first allow a player to register by entering the player's name, address phone number, etc. If the game is being offered by a casino, then the app could optionally prompt the player to enter his/her casino player (loyalty) account number so that incentives such as additional complimentary points can be automatically added to the player's player (loyalty) account. Apps can be programmed for any platform, e.g., DROID, I-PHONE, etc. Typically, each player would register and use only one cell phone. There can be any number of registered players (e.g., 1 to 10,000 or more).

If no dedicated app is used, a player can still register using other mechanisms. For example, the player can register on a web site using his or her cell phone browser (or on a separate personal computer) where the player can provide all of the player's identifying information (including the player's phone number). Alternatively, the player may be able to register by texting a text string (e.g., "register") to a particular phone number which would then automatically determine the player's phone number and register that cell phone in the game.

Once a player is registered with the host server then the player is eligible to transmit QR codes and receive automatic messages relating to the game.

From operation 500, the method proceeds to operation 501, wherein a player scans a QR code. If the player is using an app then the app would have a built in QR code reader which would scan the QR code to capture the image of the QR code (of course the player would have to position the cell phone's camera in front of the QR code) and decode the QR into its decoded text string (each QR code can be decoded into an actual string of characters).

In an alternate embodiment, the QR code does not need to be decoded by the cell phone itself and a photograph of the QR code can be transmitted (which would be decoded by the server).

In an optional operation, the player's physical location can be verified by the server by using a location technique of the player's cell phone (e.g., GPS, triangulation, etc.) This would be to prevent cheating, that is one person could photograph a QR code in one location and then a cheater could scan his/her friend's photograph as any other QR code thereby cheating the system into concluding that the cheater actually scanned the real QR code (saving the cheater the trip of having to travel to where the real QR code is). Thus, in this embodiment, each time a QR code is scanned, a verification of the player's physical location is performed. If the player is actually in the same location as the physical location of the QR code that the player just scanned, then the player gets the credit for scanning that QR code. If the player is not actually in the same location as the physical location of the QR code that the player just scanned, then the player would not get credit for that QR code and could face further negative consequences (such as being disqualified from the game).

From operation 501, the method proceeds to operation 502, wherein the decoded text string determined in operation 501 is transmitted to the server. In the alternative embodiment where the actual photograph of the QR code itself is transmitted, then this photograph is what is transmitted to the server.

From operation 502, the method proceeds to operation 503 wherein the server receives the decoded text string from the cell phone from operation 502. If the cell phone transmitted the actual photograph of the QR code itself, then the server would then decode the QR code into its decoded text string. With the decoded text string, the server can identify the actual physical location of that QR code. This can be done by using a database or data structure of all decoded text strings and their respective physical locations. Physical locations can be identified by latitude/longitude coordinates or by reference numbers manually assigned to each physical location where a QR code (such as a QR sign) can be located. For example, Table I below illustrates a sample list of decoded text strings and respective locations. The column labeled "decodes text string" refers to the number (or text string) encoded into the QR code itself (e.g., after decoding the QR code the text string is the result).

TABLE I

| decoded text string | location |
|---|---|
| 123 | Tony's Pizza Joint |
| 125 | casino floor, towards the front |
| 125 | casino floor, towards the rear |
| 130 | casino floor, party pit |
| 134 | pool area |
| 135 | Vinni's Steak House |

From operation 503, the method proceeds to operation 504 which stores the scan data in the database. The scan data is any relevant data from the scan in operation 501, such as the time, location, player identification. It is noted that if a player (in the same game) scans the same QR code a second time, typically this would be stored in the database but would not be credited to the player in the game (since the player already scanned a particular QR code he/she would typically not get any credit/progress for rescanning the same QR code). Thus, for example if a player needs to scan 5 unique QR codes, scanning the same QR code twice will still only count as one scan.

Operations 501 to 504 can be performed each time a player scans a QR code. Operation 500 typically only needs to be performed once for each cellular phone (or other portable device) used by a player.

The system would maintain a record for each player and their progress. For example a table such as Table II can be generated for each player.

TABLE II

| date | time | location |
|---|---|---|
| Feb. 3, 2012 | 08:30 | casino floor, party pit |
| Feb. 3, 2012 | 14:43 | Tony's Pizza Joint |
| Feb. 4, 2012 | 19:43 | Vinni's Steak House |
| Feb. 5, 2012 | 07:23 | McCarran Airport |

Thus, the system can also have a record of the player's physical locations which can be mined at a later time for purposes of providing the player particular player promotions. For example, since it can be determined that the player in Table II likes restaurants, a promotion offering this player a free meal could be mailed to this player in order to entice him or her to return back to the property. It is further noted that the QR codes are not limited to being placed on the physical premises owned by the company/property. For example, an advertisement can be placed in a public place (e.g., airport) which includes a QR code which can be scanned and is part of the game.

As stated above, one embodiment provides for the dynamic adjustment of traffic in order to encourage an evenly populated crowd across different areas of a property or multiple properties. When an area is overly crowded it would typically reduce the potential for monetization of that area (e.g., gaming tables/slots would be full, restaurants would have a long wait, etc.) Therefore, it is preferable to non-intrusively repopulate crowded areas to less crowded areas.

Figure 6:
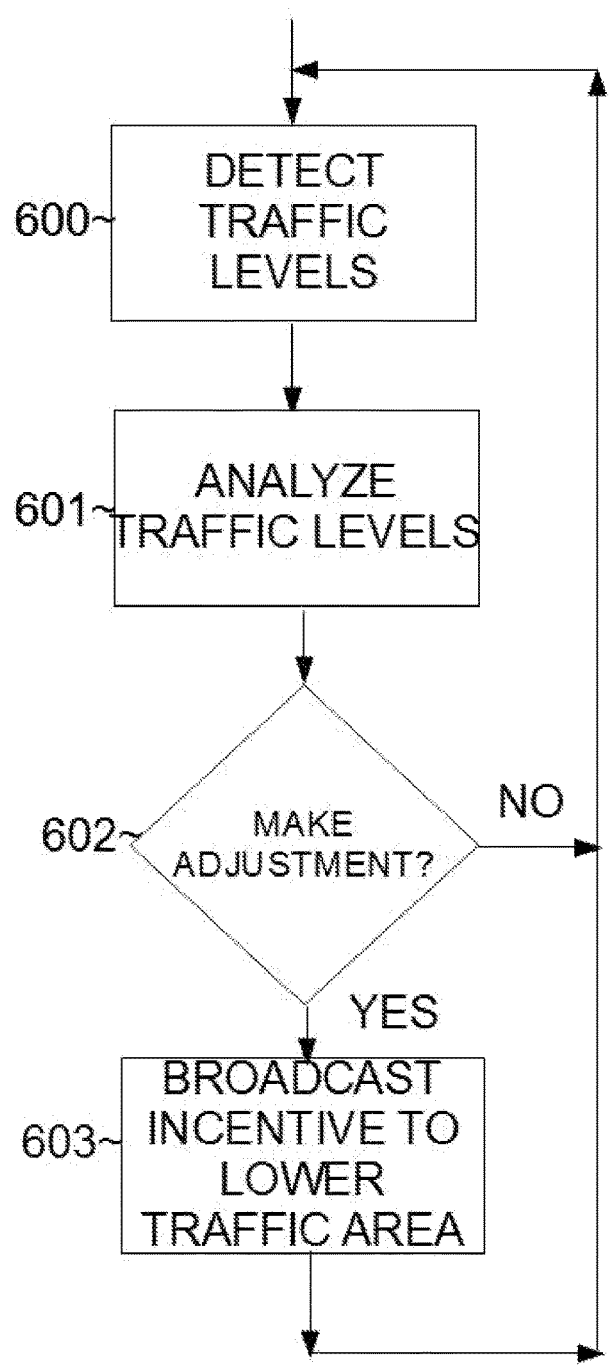
FIG. 6 is a flowchart illustrating an exemplary method of controlling traffic using QR codes, according to an embodiment.

FIG. 6 is a flowchart illustrating an exemplary method of controlling traffic using QR codes, according to an embodiment.

The method can begin with operation 600, which detects traffic levels. This can be done as described herein, for example by using electronic traffic detectors which automatically communicate a measure of the current foot traffic to the server. Another mechanism that can be used to detect traffic levels is real time data from a casino, for example a restaurant reservation system would know if the restaurant is currently operating at full capacity and if there is a long wait for a table (which dictates that that area is crowded) and this data can be transmitted to the server. As another example, a casino player tracking system can identify which gaming tables and slot machines are being used and which aren't, thus also providing traffic data which can be transmitted to the server. As an additional mechanism, a human observer can also observe an area and provide an evaluation of whether an area is "very crowded", "average", or "light" and can enter data to this effect into a terminal which would then be shared with the server.

From operation 600, the method proceeds to operation 601, which analyzes the traffic levels received in operation

600. If traffic is evenly spread out across the different regions then this would imply that no adjustment of traffic is needed. If traffic is not evenly spread out and one or more regions have significantly more traffic than another region, than an adjustment could be initiated.

The decision of whether to make an adjustment can be manual or automated. In a manual embodiment, a property employee can view an output on an output device (e.g., LCD, etc.) of real time traffic data for different regions and make a decision whether to initiate an adjustment and what adjustment to initiate.

In an automatic embodiment, the decision to make an adjustment can be made automatically using an analysis algorithm implemented by the server. For example, historical data can be maintained regarding the average traffic of different regions, and if the traffic exceeds a particular amount then an adjustment would be initiated. The region where the incentive would be offered could be selected as the current region with the lowest traffic. For example, Table III below illustrates an example of a set of regions in a property and their thresholds for adjustment.

TABLE III

| Region # | region name | average traffic | capacity |
|---|---|---|---|
| 1 | pool area | 40 people | 75 people |
| 2 | casino floor, front | 500 people | 1000 people |
| 3 | casino floor, rear | 600 | 1100 people |
| 4 | shopping area, near fountain | 200 | 500 |
| 5 | shopping area, far from fountain | 200 | 500 |

Table III represents a list of regions in a property, the average traffic for that region, and what is considered to be the maximum capacity for that region. The maximum capacity is not necessarily the legal maximum for the number of people that can be present there but a capacity at which would be considered overly crowded. Note that this is an example and a property could have many more regions than this. Note that the word "population" could also be used for the word "traffic."

Table IV below illustrates a current snapshot of the regions from Table III and their actual current traffic on a given point in time.

TABLE IV

| Region # | region name | current traffic | % of capacity |
|---|---|---|---|
| 1 | pool area | 65 people | 86% |
| 2 | casino floor, front | 800 people | 80% |
| 3 | casino floor, rear | 700 people | 64% |
| 4 | shopping area, near fountain | 900 | 180% |
| 5 | shopping area, far from fountain | 100 | 20% |

From Table IV, it can be determined that region 4 (the shopping area near the fountain) is currently at 180% of capacity (extremely crowded). Thus, the system can automatically identify all regions that are greater than 100% of their capacity and broadcast an incentive to lure people away from that area. People can be lured (incentivized to come) to the area with the lowest % of capacity. Alternatively, people can be lured (incentivized to come) to the area physically closest to the area that is greater than 100% of its capacity (that itself is not greater than 100% of its capacity). From Table IV, the server would determine that area 4 is populated greater than its capacity and that area 5 has the least % of capacity and therefore the system determines to incentivize people to report to area 5. Players can be incentivized to report to an area by offering a discount at a merchant in the area or upon each of the players scanning a QR code in the area (which would result in a discount for only the players who scanned the QR code).

From Table IV, conclusions can also be drawn about traffic levels. In one embodiment, if a traffic level is greater than 100% capacity it would be considered "high." If a traffic level is lower than a predetermined capacity (e.g., 50%) it would be considered "low." The system can broadcast incentives in order to adjust traffic from high traffic areas to low traffic areas.

Thus in operation 602, if it is determined not to make an adjustment (e.g., no region is currently greater than 100% of capacity), then the method can return to operation 600 which continues to detect and receive traffic levels in real time.

If in operation 602, it is determined to make an adjustment, then the method proceeds to operation 603, which would broadcast to all players an incentive for players to relocate to a lower traffic area.

Thus, in the above example, the system would broadcast an incentive (a message) to all players to report to area 5. For example, the message can state that all players who scan a QR code in region 5 will receive a coupon (such as an e-coupon on their cell phone) for 10% off of a merchant in region 5 (e.g., 5% off an ice cream parlor located in region 5) or located in another region. For example the message that is broadcast to all players can state, "Attention all players. All players who scan the QR code in the shopping area far from the fountain in the next five minutes will receive a free towel!" If a player does scan that QR code within the allotted time (five minutes after the message was broadcast) then the server tracks this data and the player would receive an e-coupon for the free towel (or other gift) which the player can retrieve a kiosk or desk at the property. If a player does not scan that QR code in the allotted time then of course the player would not receive the incentive.

Alternatively, the message broadcast to all players can state that all players who report to a particular merchant in region 5 (e.g., the ice cream parlor) in the next 10 minutes will receive a discount (e.g., 5% off a check at the ice cream parlor awarded by e-coupon). Typically, only players can claim these discounts (e.g., if a person shows up at the ice cream parlor wanting the 5% check who is not a player and cannot show an e-coupon, they would be refused the discount). Alternatively, everyone would be eligible for such discounts regardless of whether they are a player or not (thus everyone can claim the 5% discount at the ice cream parlor in order to reduce traffic from region 4).

From operation 603, the system can wait a predetermined time to monitor if the inventive had its intended effect to reduce traffic in a highly populated area. The method can then return to operation 600 to continue to monitor traffic levels. The incentive offered in operation 603 can continue to be offered (until the traffic levels have adjusted such that it is no longer needed) or it can expire after a predetermined amount of time. The effectiveness of each incentive offered can be stored and tabulated so that at a future time the historical data can be evaluated to see if a particular incentive actually resulted in a positive population equalization in which the population in high traffic areas subsided as a result of the incentive.

In a further embodiment implementing FIG. 6, instead of using electronic traffic detectors that are positioned throughout the property or properties, the physical locations of players can be determined using locator functions on each player's cell phone. Cell phones can be physically located using numerous techniques, such as GPS, triangulation, etc. Registered players (who have not disabled the location feature) can automatically have their location transmitted to the server at frequent intervals (e.g., every 10 seconds) and the server could apply this data to determine which regions have high traffic.

In this embodiment, incentives can be broadcast only to set particular set of players, for example players that are in a particular physical location. For example if a particular region of a property has very high traffic, then an incentive to relocate players to a lower traffic region can be broadcast only to the players that the system determines to be located in the high traffic region.

In a further embodiment, the scanning of QR codes as described herein can be used to implement a competitive game among a plurality of players.

Figure 7:
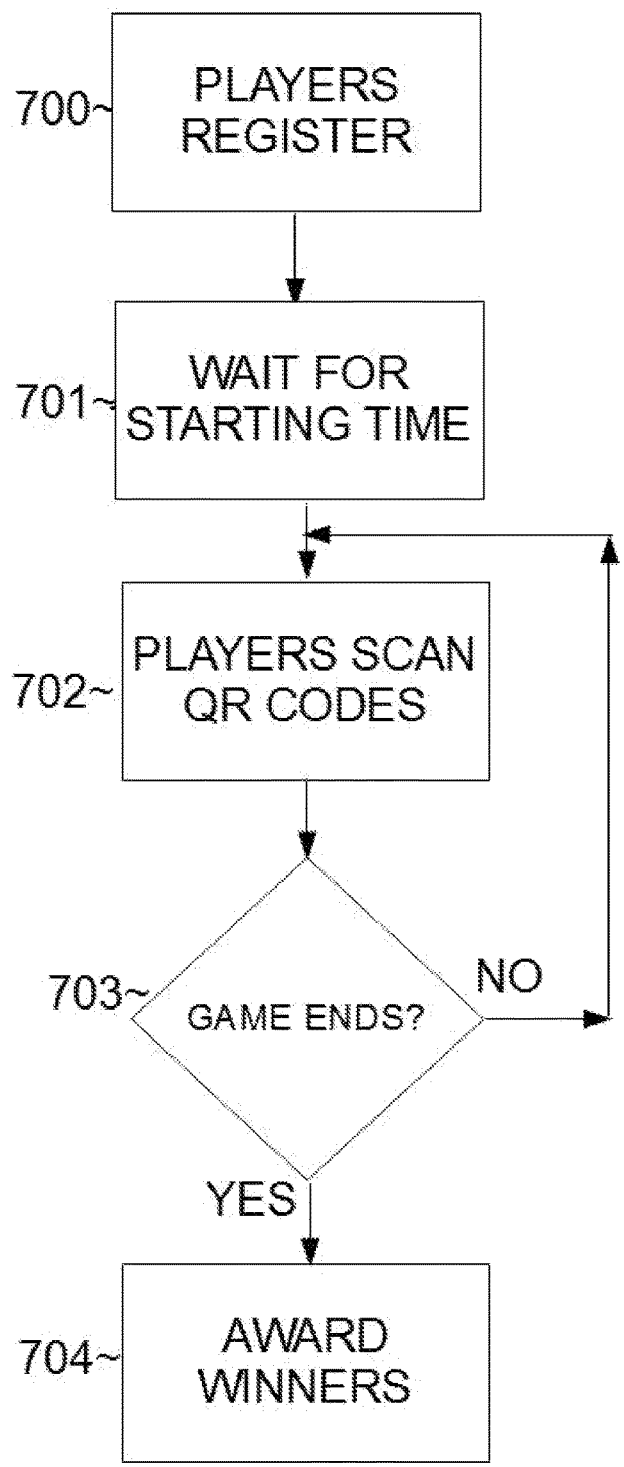
FIG. 7 is a flowchart illustrating an exemplary method of implementing a competitive game utilizing QR codes, according to an embodiment.

FIG. 7 is a flowchart illustrating an exemplary method of implementing a competitive game utilizing QR codes, according to an embodiment.

The method can begin with operation 700, wherein the players who are going to compete in the tournament register. This can be done as described herein. This can also include the player affirmatively entering the tournament (for example by pressing a button on the app which would enter the player in the tournament).

From operation 700, the method proceeds to operation 701, which waits for a starting time. A new tournament can begin every hour, every 4 hours, etc.

From operation 701, once the starting time has arrived and the game starts, the method proceeds to operation 702, wherein players scan QR codes. This is done as described herein and includes operations 501-504. Players are free to walk around the property (or other properties if they are part of the game) or even different parts of a city (e.g., Las Vegas Strip, Downtown, etc.) looking for QR codes to scan. Some QR codes may be placed easy to find locations while other QR codes would intentionally be hidden and hard to find. The goal is for players to find as many QR codes as quickly as they can. Clues can also be provided to the players (which can be texted, emailed or posted on signs) as to the locations of some QR codes.

From operation 702, the method proceeds to operation 703, wherein it is determined if the game is over. Different criteria can be used to determine if the game is over. For example, in one embodiment, the game can last a predetermined amount of time (e.g., one hour). In other words, all players have one hour (starting at the same time) to find and scan as many QR codes as they can and then the game ends (which means they will no longer get credit for scanning a QR code). In another embodiment, the game can end after a player has scanned a predetermined number of QR codes. For example, the game can end when one player has scanned 10 QR codes (which means that player is the winner), or when three players have scanned 10 QR codes (which means those players come in first place, second place, and third place in the order that they completed the scans of the 10 QR codes).

From operation 703, if the game has not ended (i.e. the ending condition has not occurred), then the method returns to operation 702 wherein the players continue playing.

If in operation 703 it is determined that the game ends, then the method proceeds to operation 704 which awards prizes to the winners and ends the game. For example the player who came in first place can win $100, the player who can in second place can win $50, and the player who can in third place can win $10 (while all other players get nothing). Alternatively, free comp points or other incentives can be awarded to the winning player(s).

Figure 8:
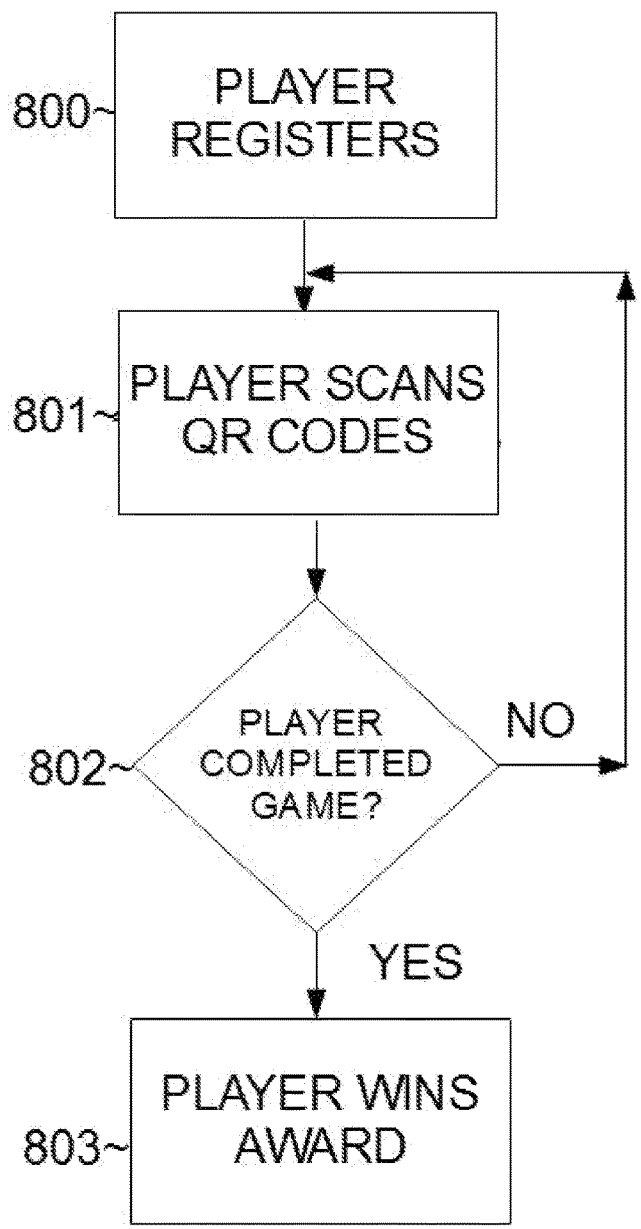
FIG. 8 is a flowchart illustrating an exemplary method of implementing a solo challenge game utilizing QR codes, according to an embodiment.

FIG. 8 is a flowchart illustrating an exemplary method of implementing a solo challenge game utilizing QR codes, according to an embodiment.

The method can begin with operation 800, wherein the player registers. This can be done as described herein.

From operation 800, the method proceeds to operation 801, wherein the player scans QR codes as the player physical walks around to different locations. This is done as described herein and includes operations 501-504.

From operation 801, the method proceeds to operation 802 which determines if the player has completed the game. If the player has satisfied a completion condition, for example the player found a predetermined number of QR codes, then the player has completed the game.

If the player has not satisfied the completion condition, then the game continues and returns to operation 801 wherein the player can continue to look for, find, and scan QR codes.

If in operation 802 it is determined that the player has completed the game, then the method proceeds to operation 803, wherein the player wins an award and the game ends. The award can be an incentive, such as a number of comp points added to the player's loyalty account at the property that offered the game, a free gift, a cash prize, etc.

Figure 9A:
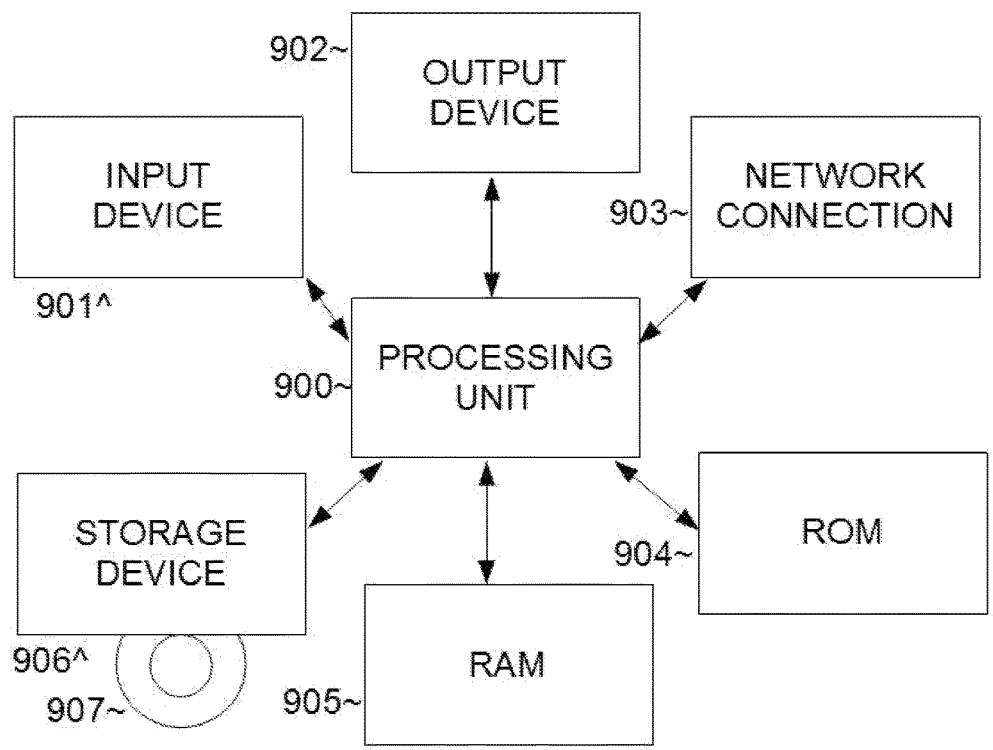
FIG. 9A is a block diagram illustrating exemplary hardware that can be used to implement all of the methods described herein, according to an embodiment.

FIG. 9A is a block diagram illustrating exemplary hardware that can be used to implement all of the methods described herein, according to an embodiment. The hardware in FIG. 9A can be used to implement any computer, server, portable device, etc. used in the system/method.

A processing unit 900 can be a microprocessor and associated structure (e.g., bus, cache, clock, etc.) which can be connected to an input device (e.g., touch-screen, keyboard, mouse, buttons, etc.), and an output device (e.g., touch-screen, CRT, monitor, etc.) The processing unit 900 can also be connected to a network connection 903 which can connect to a computer communications network such as the Internet, Wi-Fi, LAN, WAN, cellular network, etc. The processing unit 900 can also be connected to a ROM 904 and a RAM 905 as used in the art. The processing unit 900 can also be connected to a storage device 906 which can be nonvolatile storage device (e.g., BLU-RAY drive, CD-ROM drive, hard drive, flash memory, EPROM, etc.) A computer readable medium 907 (e.g., BLU-RAY disc, CD-ROM, hard disc, etc.) can be read by the storage device 906 and can store programs and assets that can cause the processing unit 900 to perform any and all of the methods described herein. The ROM and RAM can also be loaded with instructions that can cause the processing unit 900 to perform any and all of the methods described herein.

The methods described herein can also be interfaced with a web server in order for users/players or system administrators to log into the system and check respective information. For example, players can login into the system using a web browser (either on their cell phone or home computer) using the Internet and check their progress in the game (e.g., see how many QR codes they have currently scanned). They can also share this information on a social networking web site such as FACEBOOK by simply pressing a "share" button.

Figure 9B:
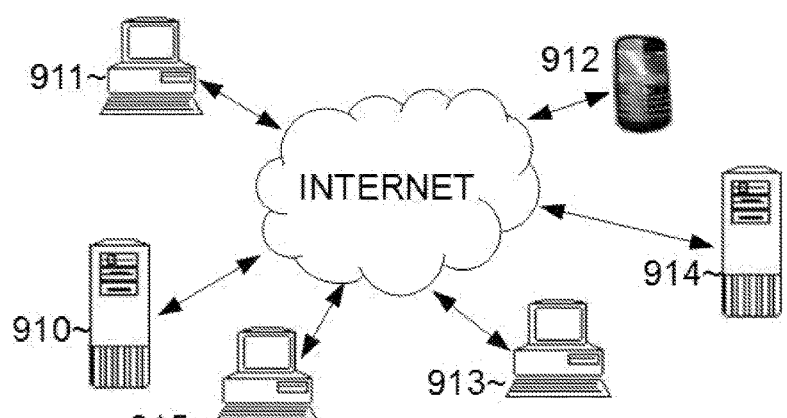
FIG. 9B is a network diagram showing a network structure for a social networking web site and players, according to an embodiment.

FIG. 9B is a network diagram showing access using the Internet, according to an embodiment.

A computer communications network (such as the Internet) can be used to connect a web server 910 which can host and serve a web site which can connect (directly or indirectly) to the host server 914 (which is the same as the host server 407). Server 914 407 are shown herein as one server but can actually encompass numbers computers and systems across different physical locations that are all in communication with each other in order to perform all of the methods/operations described herein. The web server 910 can provide game information to players 911, 913 who log into their accounts, such as the locations of the QR codes they have currently scanned, their current standing in a tournament, and any other such game information. The web server 910 can get the information it transmits to the players from the host server 914. Information from server 914 can be accessed directly from the Internet or indirectly through the web server 910 which provides a web-enabled access system.

A system administrator 915 can log into the web site hosted by the web server 910 in order to access and configure the system. The system administrator can perform tasks such as setting up a new tournament, identifying the locations and identifications (text strings after decodes) of new QR codes that have been placed, identifying prizes, awards, incentives, coupons, for various actions. For example, if the award for winning a daily tournament is $50 cash, the administrator can set this fact. If traffic is to be adjusted from a high traffic area to a low traffic area, the incentive/coupon can be set by the administrator (e.g., 100 free casino loyalty points added directly to the user's account or a free mug). Any parameter of the system can be set by the system administrator.

Note that while FIG. 9B shows only one server as the web server 910 and host server 914, these servers 910, 914 can encompass numerous servers all cooperating with each other (whether in the same physical location or not). The web server 910 communicates with players 911, 913 through the Internet (or other computer communication network) and can access and provide information to the players upon request. Host server 914 can also implement all methods described herein by executing computer code programmed accordingly. The web server 910 is connected to the Internet and can communicate with all of the players 911, 913 (of course many other players can be accommodated which are not pictured) and can offer a bridge to the information stored in host server 914. All of the communications described in this document can be effectuated using any network configuration.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein. All determinations, computations, and processes described in this document can be made electronically based on computer algorithms which are specifically programmed for the purposes described. All parts of the system described herein that serve any function have a communications link (of any kind) with all other parts of the system that it needs to communicate with to perform its function.

Any description of a component or embodiment herein also includes hardware, software, and configurations which already exist in the prior art and may be necessary to the operation of such component(s) or embodiment(s). All variables and values described herein can take on any numerical value, including zero or values greater than zero.

Furthermore, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to adjust foot traffic, the method comprising:
providing traffic detectors;
storing a respective capacity for a plurality of regions comprising a first region and a second region;
physically placing a marker in a first region;
enabling users to register their portable devices;
determining a number of people in the second region using data received from the traffic detectors;
determining to adjust traffic from the second region to the first region by determining that the number of people in the second region is greater than the respective capacity for the second region;
transmitting a message to the portable devices indicating an incentive to users to scan the marker in the first region;
receiving, at a server, a scan of the marker in the first region from a mobile device of a particular user; and
providing the particular user an incentive in response to the receiving the scan of the marker in the first region.

2. The method as recited in claim 1, wherein the marker is a QR code.

3. The method as recited in claim 1, wherein the determining to adjust traffic also requires that the data received from the traffic detectors indicates that traffic in the first region is low.

4. The method as recited in claim 1, wherein the incentive is provided to the user via an e-coupon on the mobile device of the particular user.

5. The method as recited in claim 4, wherein the e-coupon provides a discount to a merchant.

6. The method as recited in claim 1, wherein the incentive to users to scan the marker in the first region is only active for a predetermined period of time.

7. The method as recited in claim 1, wherein the first region and the second region are in the same physical building.

8. The method as recited in claim 1, wherein the first region and the second region are in different physical buildings.

9. An apparatus to adjust foot traffic, the method comprising:
a marker located in a first region;
a plurality of traffic detectors;
a network connection;
a server connected to the network connection, the server configured to read computer readable instructions from a computer readable storage and execute the computer readable instructions, the computer readable instructions programmed to:

store a respective capacity for a plurality of regions comprising a first region and a second region;

enable users to register their portable devices;

determine a number of people in the second region using data received from the plurality of traffic detectors;

determine to adjust traffic from the second region to the first region when the number of people in the second region is greater than the respective capacity for the second region and when it is determined to adjust traffic, then:

transmit a message to the portable devices indicating an incentive to users to scan the marker in the first region;

upon receipt, at a server, of a scan of the marker in the first region from a mobile device of a particular user then provide the particular user an incentive in response to the receiving the scan of the marker in the first region.

10. The apparatus as recited in claim 9, wherein the marker is a QR code.

11. The apparatus as recited in claim 9, wherein the computer readable instructions are further programmed such that the determination to adjust traffic from a second region to the first region is made when it is also determined that traffic in the first region is low.

12. The apparatus as recited in claim 9, wherein the computer readable instructions are further programmed such that the incentive provided to the user is via an e-coupon on the mobile device of the particular user.

13. The apparatus as recited in claim 12, wherein the e-coupon provides a discount to a merchant.

14. The apparatus as recited in claim 9, wherein the computer readable instructions are further programmed such that the incentive to users to scan the marker in the first region is only active for a predetermined period of time.

15. The apparatus as recited in claim 9, wherein the first region and the second region are in the same physical building.

16. The apparatus as recited in claim 9, wherein the first region and the second region are in different physical buildings.

17. The method as recited in claim 1, wherein the traffic detectors comprise a restaurant reservation system.

18. The apparatus as recited in claim 9, wherein the plurality of traffic detectors comprise a restaurant reservation system.

* * * * *